(12) United States Patent
Ashraf et al.

(10) Patent No.: US 10,726,572 B2
(45) Date of Patent: Jul. 28, 2020

(54) DETERMINATION OF DISPLAY POSITION

(71) Applicant: INTERNATIONAL BUSINESS MACHINES CORPORATION, Armonk, NY (US)

(72) Inventors: Uwais Ashraf, Chandler's Ford (GB); Stewart O. M. Francis, Hampshire (GB); Craig J. Morten, Surrey (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 15/831,723

(22) Filed: Dec. 5, 2017

(65) Prior Publication Data
US 2019/0172217 A1 Jun. 6, 2019

(51) Int. Cl.
*G06T 7/70* (2017.01)
*G06K 9/62* (2006.01)
*G06K 9/32* (2006.01)

(52) U.S. Cl.
CPC .............. *G06T 7/70* (2017.01); *G06K 9/3208* (2013.01); *G06K 9/6202* (2013.01)

(58) Field of Classification Search
CPC ....... G06K 9/3208; G06K 9/6202; G06T 7/70
See application file for complete search history.

(56) References Cited

U.S. PATENT DOCUMENTS

| | | | |
|---|---|---|---|
| 5,923,307 A | 7/1999 | Hogle, IV | |
| 8,711,091 B2 | 4/2014 | Nomura et al. | |
| 9,354,840 B2 | 5/2016 | Seo et al. | |
| 2009/0324024 A1* | 12/2009 | Worthington | A61B 5/103 382/118 |
| 2016/0162243 A1 | 6/2016 | Neisler et al. | |

FOREIGN PATENT DOCUMENTS

| | | |
|---|---|---|
| EP | 2912861 B1 | 10/2013 |
| KR | 1020130124101 A | 5/2012 |

OTHER PUBLICATIONS

Derene, Glenn "How to Set up Multiple Monitors", dated Jan. 21, 2011; retrieved from Internet URL: http://www.popularmechanics.com/technology/gadgets/how-to/a11710/how-to-set-up-multiple-monitors/; 5 pgs.
Kidman, Angus "Can Workstations Work With Hot Desking?" dated Jul. 31, 2014; retrieved from Internet URL: https://www.lifehacker.com.au/2014/07/can-workstations-work-with-hot-desking/ ; 5 pgs.

* cited by examiner

*Primary Examiner* — Manuchehr Rahmjoo
(74) *Attorney, Agent, or Firm* — Cantor Colburn LLP; Noah Sharkan

(57) ABSTRACT

A reference image of the field of view in a reference state of illumination is obtained. The display is controlled to display a first image to the object to cause the field of view to be in a first state of illumination different from the reference state of illumination. A first captured image of the field of view in the first state of illumination is then obtained. Based on the reference image and the first captured image, a position of the display relative to the object is determined.

20 Claims, 7 Drawing Sheets

EXAMPLE WITH MONITOR DIRECTLY IN FRONT OF USER

FIRST CAPTURED IMAGE   REFERENCE IMAGE   DIFFERENCE IMAGE 410   420   430

DETERMINATION OF DISPLAY POSITION

BACKGROUND

The present invention relates to the field of displays, such as computer monitors and display screens for example, and more particularly to a method for determining a position of display relative to an object, such as viewer's face for example.

The present invention further relates to a computer program product comprising computer-readable program code that enables a processor of a system to implement such a method.

The present invention yet further relates to a system for determining a position of a display relative to an object.

When arranging one or more displays for use, it can be cumbersome and/or difficult to go move the display(s) to a preferred or required position.

This can be exaggerated in situations where 'hot-desking' of 'docking' is used in combination with multiple users so that the position of a display may need to be determined and then rearranged every time a new user uses a display. Such repeated identification of display position and repositioning for one or more displays wastes valuable time and resources.

SUMMARY

The present invention seeks to provide a method for determining a position of a display relative to an object within a field of view of the display.

The present invention further seeks to provide a computer program product including computer program code for implementing the method when executed on a processor of a data processing system.

The present invention yet further seeks to provide a system adapted to execute this computer program code.

The present invention also seeks to provide for determining a position of a display relative to an object within a field of view of the display.

According to an embodiment of the present invention there is provided a computer-implemented method for determining a position of a display relative to an object within a field of view of the display. The method comprises obtaining a reference image of the field of view in a reference state of illumination. The method also comprises controlling the display to display a first image to the object to cause the field of view to be in a first state of illumination different from the reference state of illumination. The method further comprises obtaining a first captured image of the field of view in the first state of illumination. A position of the display relative to the object is then determined based on the reference image and the first captured image.

According to another embodiment of the present invention, there is provided a computer program product for determining a position of a display relative to an object within a field of view of the display. The computer program product comprises a computer readable storage medium having program instructions embodied therewith, the program instructions executable by a processing unit to cause the processing unit to perform a method according to an embodiment of the invention.

According to another aspect of the invention, there is provided a system comprising at least one processor and the computer program product according to an embodiment. The at least one processor is adapted to execute the computer program code of said computer program product.

According to yet another aspect of the invention, there is provided a system for determining a position of a display relative to an object within a field of view of the display. The system comprises an interface adapted to obtain a reference image of the field of view in a reference state of illumination and to obtain a first captured image of the field of view in a first state of illumination different from the reference state of illumination. The system also comprises a display controller adapted to control the display to display a first image to the object to cause the field of view to be in the first state of illumination. The system further comprises a calculation unit adapted to determine a position of the display relative to the object based on the reference image and the first captured image.

BRIEF DESCRIPTION OF THE DRAWINGS

Preferred embodiments of the present invention will now be described, by way of example only, with reference to the following drawings, in which.

DETAILED DESCRIPTION

Figure 1:
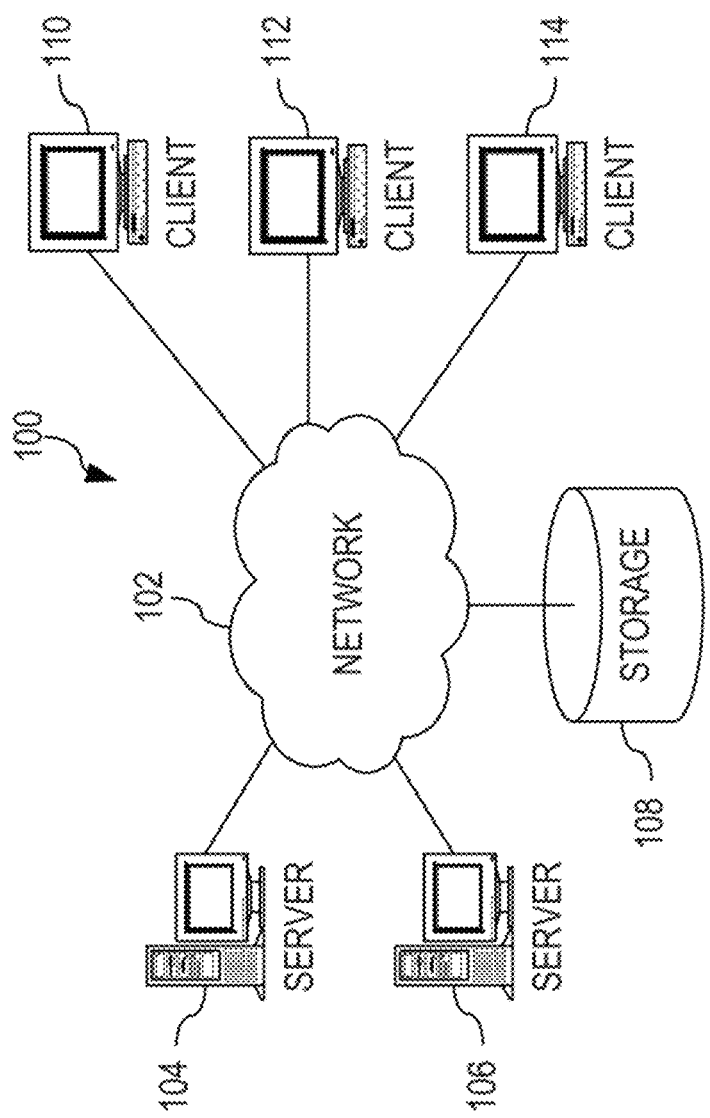
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed is a concept for determining a position of a display (such as a display panel, computer monitor, display screen, television screen, etc.) relative to an object within a field of view of the display. By determining a relative position of a display, the display may then be automatically adjusted or arranged according to a predetermined preference or requirement. Proposed embodiments may therefore enable automatic identification and arrangement of a display position relative to a viewer for example.

By way of example, two images of an object in the field of view (e.g. situated in front of) of a display may be captured, one with the display switched off and one with the display displaying an image at full brightness. Using image analysis of the two captured images, a position of the display relative to the object may then be determined. For example, the image captured with the display switched off may be considered a reference image depicting a reference state of illumination of the object, and the image captured with the display displaying an image at full brightness may be compared against the reference image to identify which portions of the object are illuminated by the light from the displayed image. Based on the illuminated portions of the object, a relative position of the display may then be determined.

An approach to identifying a position of a display using light emitted by the display may therefore be proposed.

Proposed embodiments may therefore be implemented using standard or conventional hardware that is available in (or for use with) displays. For instance, embodiments may be implemented using a laptop, personal computer, or personal computing device that comprises a display screen and a camera (such as a webcam or an integrated front-facing camera for example).

By employing the proposed concept(s), an arrangement of a display relative to a viewer or user may be automatically identified. Information about the identified arrangement may then be communicated to the user/viewer and/or used to automatically adjust the arrangement of the display. This may facilitate automatic adjustment information or instructions to be determined when a new viewer/user employs a display. Automated arrangement of displays for hot-desking or docking users may thus be facilitated by embodiments.

In an exemplary embodiment, the display may be adapted to be powered off in the reference state of illumination. The reference image of the field of view may therefore comprise an image of the field of view with the display turned off, thus providing what may be thought of as a neutral or base image against which the first captured image may be compared.

In another embodiment the display may be adapted to display a base image different from the first image. In such an embodiment, the reference image of the field of view may thus comprise an image of the field of view with the display illuminating the field of view with a known or predetermined pattern and/or color of light. This may provide what may be considered a base or reference image against which the first captured image may be compared.

In an embodiment, the first image may comprise a block or pattern comprising a first color. For example, the first image may simply comprise a single color (or substantially the same color throughout a large or majority portion of the image) having a predetermined luminosity value (preferably a high to maximum luminosity value). The color may be chosen to be a color that is not present (or widespread) in the reference image, so as to make a comparison process easier. It is envisaged that a first image having a high brightness (e.g. a single color with high luminosity value) will be preferable so that the light from it being displayed by the display can be easily seen reflecting from the object.

In proposed embodiment, determining a position of the display relative to the object may comprise: determining a difference between the reference image and the first captured image; and determining a position of the display relative to the object based on the determined difference. For example, determining a difference between the reference image and the first captured image may comprise subtracting the reference image from the first captured image to obtain a difference image. In this way, the difference image may comprise mainly black or dark pixels (e.g. where the detected light in the reference state and first state of illumination is substantially unchanged) but also some colored pixels (e.g. from where the light from the display of the first image by the display device is reflected and detected). The step of determining a position of the display relative to the object may then comprise analyzing the difference image, for example by analyzing what portions or locations of the object have reflected light from the display of the first image.

Some embodiments may further comprise the step of generating a signal for adjusting a position of the display relative to the object based on the determined position of the display relative to the object. Such embodiments may therefore provide information and/or signals that may be employed to automatically adjust the display position, e.g. based on a comparison between the display's determined position relative to the user and predetermined requirement or preference. Automatic optimization of the display's position relative to a user/viewer may thus be facilitated by proposed embodiments.

Embodiments may further comprise: controlling the display to display a second image to the object so as to cause the field of view to be in a second state of illumination different from the first state of illumination, the second image being different from the first image; obtaining a second captured image of the field of view in the second state of illumination; and determining an orientation of the display based on the first captured image and the second captured image. For example, display orientation may be determined by displaying a block or band of single color (e.g. bright red) in different positions whilst capturing respective images of the field of view of the display. By analyzing how regions of the detected light in the captured images vary with respect to the position of the displayed block or band of single color, an orientation of the display may be determined. For instance, if the display of a vertical red line progressing from left to right (when viewed facing the display, i.e. from in front of the display) in sequentially displayed images is detected in the captured images as moving from top to bottom (or from bottom to top), it may be determined that the display is in a portrait configuration/orientation (e.g. that the display is rotated by 90° clockwise with respect to its normal landscape orientation). Some embodiments may thus also comprise the step of generating a signal for adjusting an orientation of the display based on the determined orientation of the display. This may, for example, be employed to automatically adjust the display orientation, e.g. based on a comparison between the display's determined orientation and predetermined requirement or preference. Automatic optimization of the display's orientation may thus be facilitated by proposed embodiments.

Thus, in embodiments, determining an orientation of the display may comprise: determining a difference between the first captured image and the second captured image; and determining an orientation of the display based on the determined difference between the first captured image and the second captured image. Simple, non-computationally expensive processes may be employed which can not only determine a relative position of a display but can also determine its orientation. Useful positioning and orientation information regarding a display may thus be ascertained by embodiments using only minimal resources (which may for instance already be available as part of standard or conventional display arrangements).

For example, determining a difference between the first captured image and the second captured image may comprise subtracting the first captured image from the second captured image to obtain a delta image. A simple mathematical procedure may thus be implemented without requiring complex or expensive resources. Determining an orientation of the display may then comprise analyzing the delta image, for example so as to identify if there is directional offset or translation between light or colored pixels in the delta image.

In a proposed embodiment, the first image may comprise a block or pattern comprising a first color in a first position in the first image, and the second image may comprise a block or pattern comprising the first color in a second position in the second image, the second position being offset relative to the first position in a reference direction. The first and second images may thus be adapted such that they contain the same or similar blocks or patterns, but wherein the blocks or patterns are offset relative to each other in a predetermined direction. Prior knowledge of this direction may then be employed to determine an orientation of the display by comparing it with a direction between pixels of the first and second captured images. In this way, the step of determining an orientation of the display may be further based on the reference direction.

The object may, for example, comprise the head of a person. In some embodiment, the object may comprise a person (e.g. user or viewer), or one or more parts thereof (such the torso, shoulders, neck and head for example). In this regard, some embodiments may be adapted to cater for the object comprising the face of a person.

Proposed embodiments may overcome shortcomings of existing display arrangement concepts which require additional or proprietary hardware and/or employ complex and computationally expensive algorithms.

Accordingly, there may be provided an approach which provides automatic identification of a display position relative to an object (such as a user or viewer) by simply controlling the display to alter an illumination state of the object and then analyzing the how the change in illumination state alters the light reflected from the object. The use of additional and/or expensive hardware may thus be avoided by proposed embodiments.

Embodiments may also provide concepts for automatically determining an arrangement of a display and a viewer/user, so as to facilitate automated adjustment of the display (e.g. by ensuring the relative arrangement of display and viewer/user adheres to one or more predetermined requirements or preferences).

Illustrative embodiments may therefore provide concepts for controlling the arrangement of one or more displays according to the personal preference(s) or requirements. Dynamic and customizable display arrangement concepts may therefore be provided by proposed embodiments. For example, embodiments may facilitate the positioning of multiple monitors relative to each other according to predetermined requirements or preferences. For instance, certain embodiments may assists in arranging the relative position and/or orientation of a plurality of computer monitors so as to ensure that moving a cursor (e.g. pointer, arrow or other icon manipulated using a mouse device) of an operating system displayed by the monitors works correctly (or as expected) when the cursor moves between monitors (e.g. from one monitor to another).

Modifications and additional steps to a display or display system may also be proposed which may enhance the value and utility of the proposed concepts.

Figure 2:
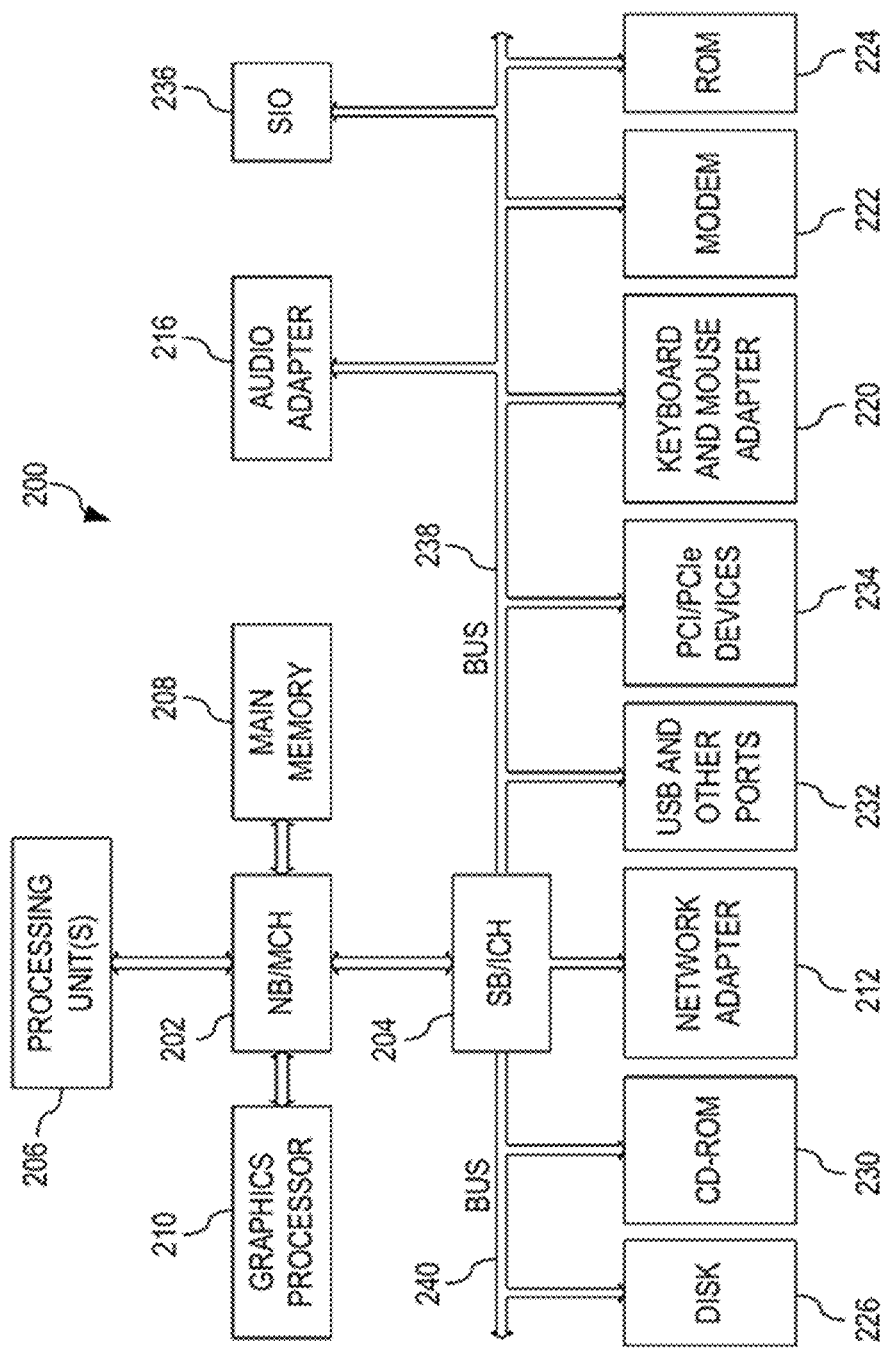
FIG. 2 is a block diagram of an example system in which aspects of the illustrative embodiments may be implemented.

Illustrative embodiments may be utilized in many different types of task processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed transaction processing storage system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a display arrangement by enabling the identification of a display's position relative to user or viewer, and this may be done using standard or conventional hardware that is widely available in (or adapted for use with) a such a display. By providing the automatic identification of the display's position relative to a user/viewer, proposed embodiments may enable the position of the display to be automatically adjusted (e.g. according to a requirement or preference) without any user input being required. This may enable cursor or icon movement to be displayed correctly and/or as desired, for example. Further, the requirements or preferences of different users may be stored and used when determining how to adjust the position of the display, thus enabling automatic adjustment tailored to different users/viewers. Such tailored adjustment may be particularly advantageous for hot-desking arrangements, wherein a display may be regularly used by different user/viewers. Such proposals can improve the flexibility, customization capabilities and/or user experience provided by a display arrangement.

Figure 3:
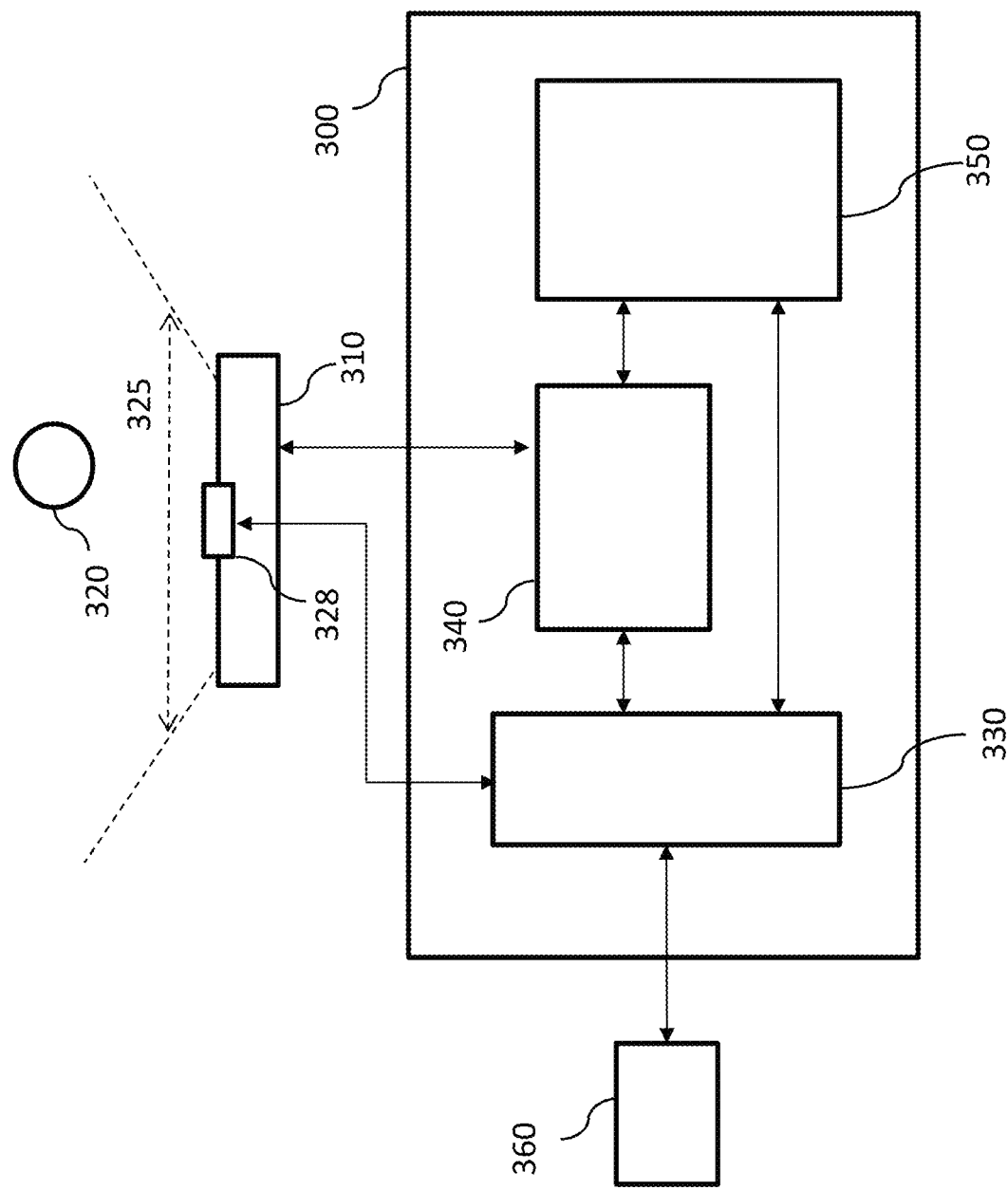
FIG. 3 is a simplified block diagram of a system for determining a position of a display relative to an object within a field of view of the display.

Referring now to FIG. 3, there is depicted a simplified block diagram of a system 300 according to an embodiment.

Here, the system 300 is for determining a position of a display 310 relative to an object 320 within a field of view 325 of the display 310. In particular, the object 320 is a person (e.g. a viewer) and the display is a computer monitor (e.g. an LCD or LED display unit) with an integrated, front-facing camera 328. The system 300 may determine a position of the display 310 relative to the person 320 by comparing two captured images of the person 320, one image captured with the display 310 switched off and the other image captured with the display 310 displaying an image to the person 320. For example, by identifying the portions of the person 320 illuminated by the display of the image, a position of the display 310 relative to the person 320 may then be determined.

Accordingly, it will be understood that an arrangement of the display 310 relative to the person (e.g. viewer) 320 may be automatically identified. Information about the identified arrangement may then be communicated (e.g. to the person 320 or a display adjustment arrangement) to facilitate adjust of the position of the display 310. This may facilitate automatic adjustment information or instructions to be determined whenever a new person 320 uses the display 310.

In the example of FIG. 1, the system 300 comprises an interface 330 adapted to obtain a reference image of the field of view in a reference state of illumination. Here, the interface 330 is adapted to receive the reference image from the front facing camera 328 of the display unit. In particular, the camera 328 is adapted to capture the reference image of the field of view when the display is powered off, and the captured reference image is communicated to the interface 330.

The system 300 also comprises a display controller 340 that is adapted to control the display 310 to display a first image to the person 320 so as to cause the person 320 or field of view 325 to be in a first state of illumination, the first state of illumination differing from the reference state of illumination.

The camera 328 is then adapted to capture a first image of the person 320 or field of view 325 in the first state of illumination. The captured first image is then also communicated to the interface 330.

Thus, it will be appreciated that the interface 330 is adapted to receive (from the camera 328) the reference image of the field of view and the first captured image of the field of view. Based on the reference image and the first captured image, a calculation unit 340 of the system 300 determines a position of the display 310 relative to the person 320.

In particular, in the depicted embodiment of FIG. 1, the calculation unit 340 is adapted to determine a difference between the reference image and the first captured image. Based on the determined difference, the calculation unit 340 then determines a position of the display relative to the object.

The system 300 also comprises a signal generator 350 that is adapted to generate a signal for adjusting a position of the display 310 relative to the person based on the determined position of the display 310. By way of example, the signal generator 350 of the system 300 is adapted to provide the generated signal to at least one of: the interface 330 for subsequent provision to the display 310 (e.g. for displaying information to the person 320); and a display adjustment unit 360 which is adapted to adjust a position of the display 310 based on received signal(s).

Although the embodiment of FIG. 1 has been described above as being adapted to have the display 310 switched off (or 'powered off') in the reference state of illumination, it is to be understood that, in alternative embodiments, the controller may be adapted to control the display 310 to display a base image different from the first image when in the reference state of illumination.

Also, in some proposed embodiments, the display controller 340 may be further adapted to control the display 310 to display a second image different from the first image so as to cause the field of view 325 to be in a second state of illumination different from the first state of illumination. The interface 330 may then be further adapted to obtain a second captured image of the person 320 or field of view 325 in the second state of illumination, and the calculation unit 340 may then be further adapted to determine an orientation of the display 310 based on the first captured image and the second captured image.

From the description provided above, it will be understood that proposed embodiments may provide a display position identification concept that can be employed with a conventional image capture device (e.g. digital camera) and display device (e.g. computer monitor, LCD display, OLED display, etc.). By way of example, such embodiments may address the specific issue of having to determine how a display is positioned and how it should be adjusted (e.g. for optimal viewing or to adhere to individual viewer preferences).

By way of providing a further example of how an embodiment may be implemented, a webcam attached to a laptop/desktop display may take a picture of the user in front of the display with the display switched off (or displaying a uniform color image with brightness) so as to obtain a reference image. The display may then be turned on with full brightness displaying a color not in common with the reference image and a picture may be taken of the user so as to obtain a first captured image. Using image analysis of the reference image and the first captured image, the approximate location of the display relative to the user's face may be determined.

For example, if the left of the user's face is much redder (assuming the monitor showed a full screen of red at full brightness) than the reference image it can be inferred that the display is positioned to the left of the user's face.

To facilitate the analysis of the illumination of the user's face caused by the display the first captured image can have the reference image subtracted from it to reveal the effect of the illumination from the display. This results in a mainly black difference image wherein pixels that haven't changed except for a slight increase in red that is reflected off foreground objects including the user's face. An example of this is depicted in FIG. 4 which shows exemplary reference and first captured images along with the resulting difference image.

Figure 4:
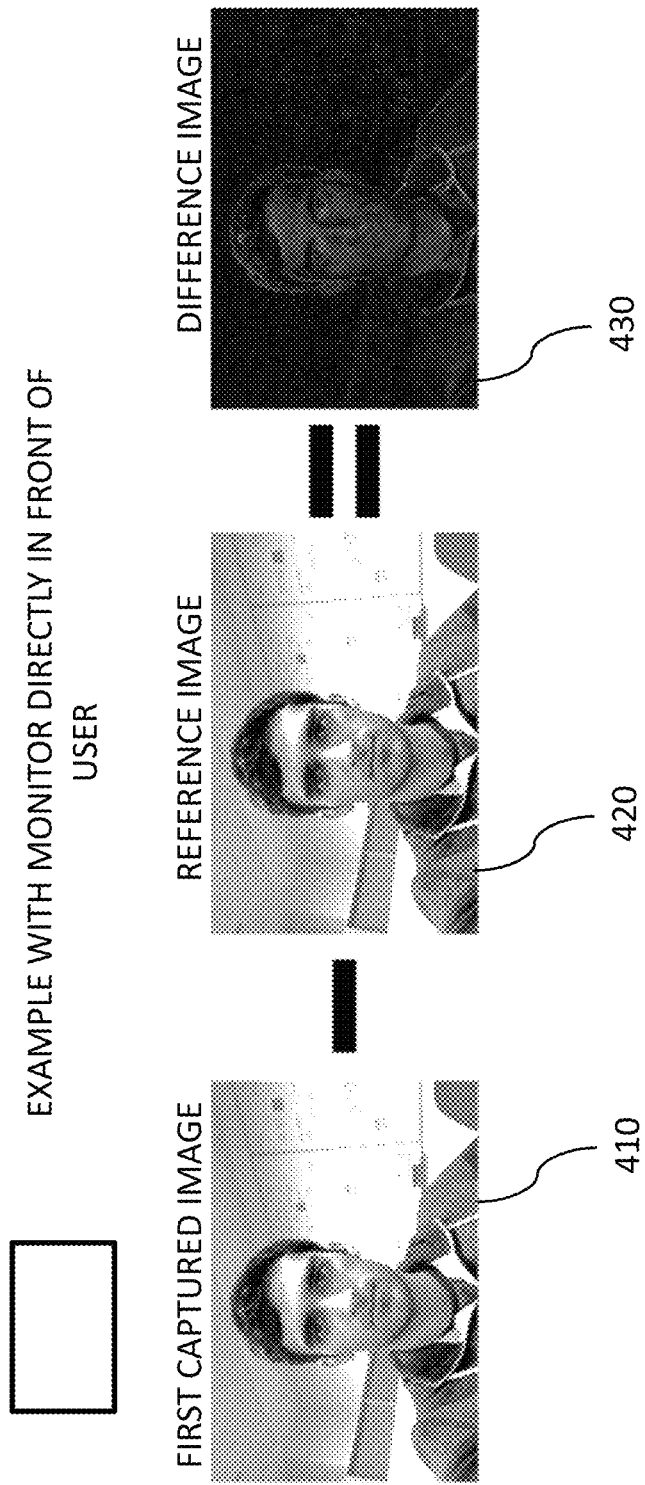
FIG. 4 depicts exemplary reference and first captured images together with the resulting difference image, wherein a computer monitor is positioned directly in front of the user's face.

More specifically, in the example of FIG. 4, a computer monitor is positioned directly in front of the user's face. The first captured image 410 is an image of the user's face captured using a front-facing camera of the computer monitor when the computer monitor is adapted to display an entire screen of bright red (so that the user's face is in a first state of illumination, namely illuminated, at least in part, by red light). The reference image 420 is an image of the user's face captured using the front-facing camera of the computer monitor when the computer monitor is switched off (so that the user's face is in a reference state of illumination). Subtracting the reference image 420 from the first captured image 410 provides the difference image 430. The difference image 430 comprise substantially black pixels that haven't changed except for a slight increase in red that is reflected off foreground objects including the user's face. The difference image 430 thus shows the whole of the user's face being illuminated with a small amount of red light from the display in the first state of illumination.

Figure 5:
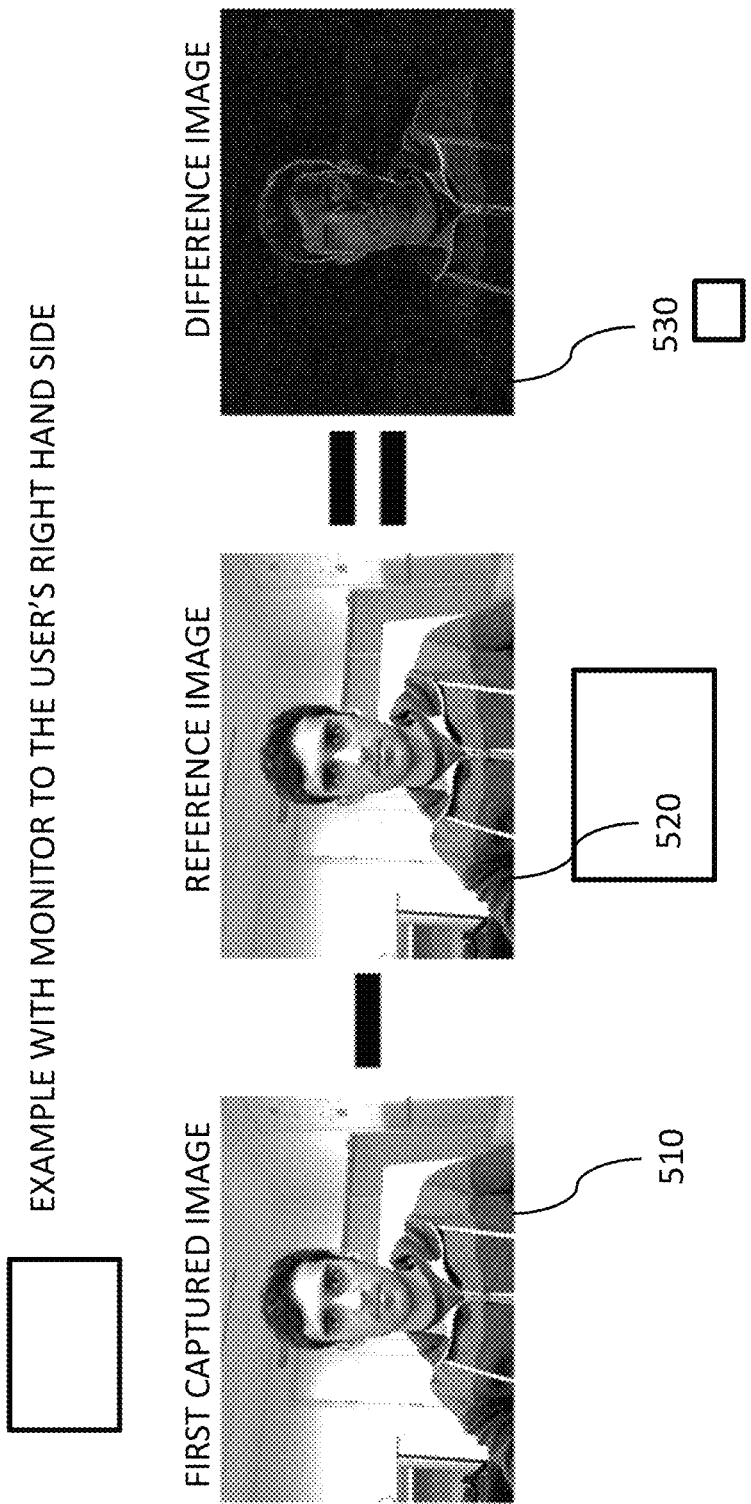
FIG. 5 depicts exemplary reference and first captured images together with the resulting difference image, wherein a computer monitor is positioned to the user's right side.

Another example is depicted in FIG. 5 which shows exemplary reference and first captured images along with the resulting difference image for when a computer monitor is positioned to the user's right side. The first captured image 510 is captured when the computer monitor is adapted to display an entire screen of bright red (so that the user's face is in a first state of illumination, namely illuminated, at least in part, by red light). The reference image 520 is an image of the user's face captured using the front-facing camera of the computer monitor when the computer monitor is switched off (so that the user's face is in a reference state of illumination). Subtracting the reference image 520 from the first captured image 510 provides the difference image 530. The difference image 530 comprise substantially black pixels that haven't changed except for a slight increase in red that is reflected off foreground objects including the user's face. The difference image 530 thus shows the right-hand side of the user's face being illuminated with a small amount of red light from the display in the first state of illumination. Thus, using image analysis, the user's face can be identified and it can be determined that the display is positioned to right of the user.

With the relative position of the display been established in accordance with proposed embodiment, this may be extended to provide further features and/or accuracy. For example, display orientation may be determined by displaying a band of color (e.g. red or blue) which is adapted to move from left to right of the display while a series of images of the environment in front of the display is captured. For a horizontally-oriented (i.e. landscape orientation) display, the series of captured images will show the red tint moving from right to left when progressing through the sequence of captured images (in order of capture). However, if the monitor is orientated vertically (i.e. portrait orientation) the red band will move from bottom to top or top to bottom when progressing through the sequence of captured images (in the order of capture). Thus, the direction of the displayed band's movement may enable an orientation of the display to be identified.

Although a moving band of color has been detailed, it will be understood that alternative approaches may be employed. For instance, the display may be controlled to display two different images sequentially. The first image may comprises a block or pattern comprising a first color in a first position in the first image, and the second image may comprises a block or pattern comprising the first color in a second position in the second image, the second position being offset relative to the first position in a reference direction. By analyzing how a illumination of an object changes between displaying of the first and second images in conjunction with the reference direction, an orientation of the display may be determined.

Further, it is envisaged that, in the future, 3-dimensional image analysis may become quicker or easier and dual camera set-ups may become more common to allow for the construction of a 3-dimensional model of the foreground object under different illumination states. With a 3-dimensional model and improved processing power, elements of the captured image(s) (like shadows caused by bumps on a face, such as nose, eyebrows etc.) may allow for even more accurate tracking of the relative position or location of light being emitted by a display.

Also, in a multi-display arrangement, a process according to a proposed embodiment may be repeated sequentially so as to determine a position of each of the plurality of displays.

Figure 7:
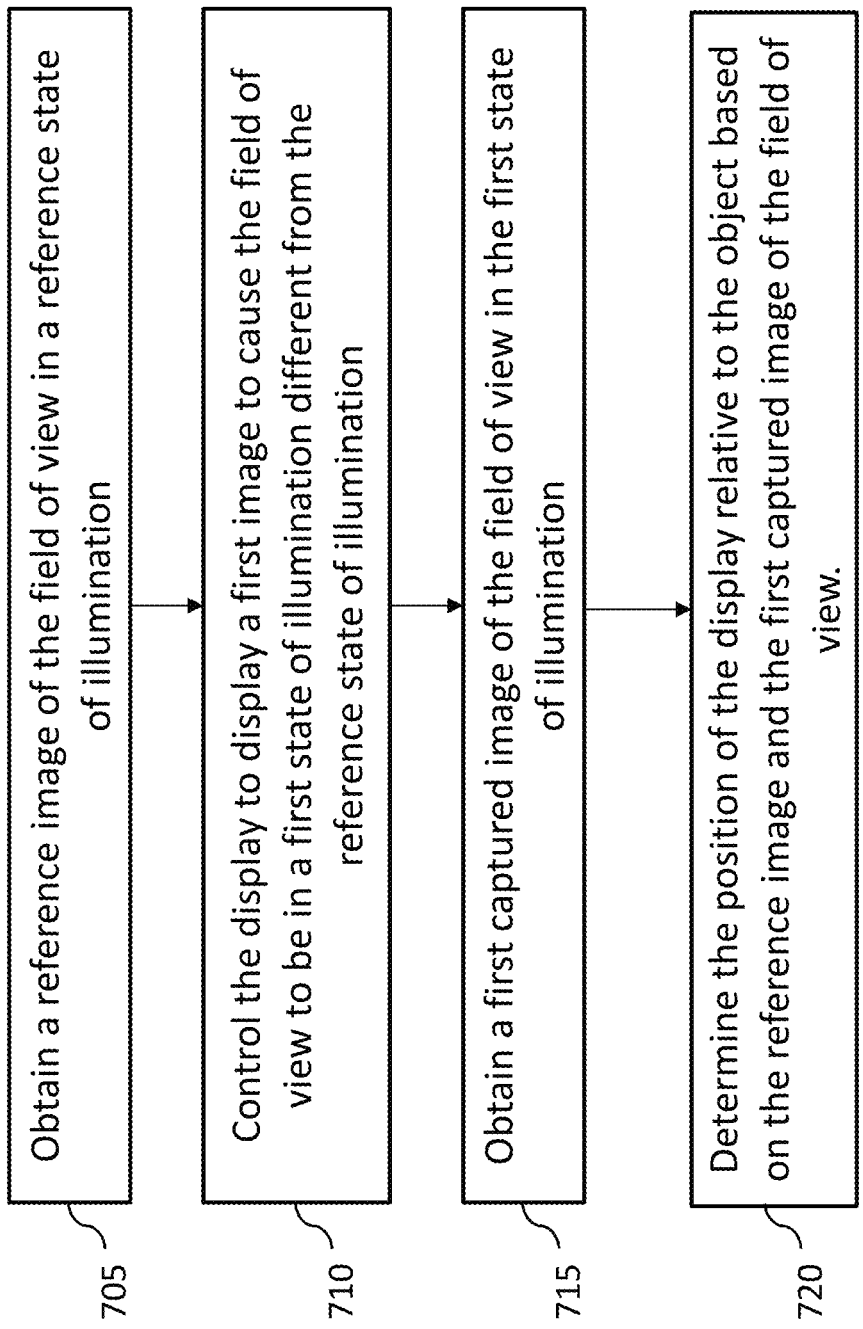
FIG. 7 depicts a flowchart of a method for determining a position of a display relative to an object according to an embodiment.

According to an embodiment of the present invention, as shown in FIG. 7, there is provided a computer-implemented method for determining a position of a display relative to an object within a field of view of the display. The method includes obtaining a reference image of the field of view in a reference state of illumination, as shown at block 705. The method also comprises controlling the display to display a first image to cause the field of view to be in a first state of illumination different from the reference state of illumination, as shown in block 710. The method further includes obtaining a first captured image of the field of view in the first state of illumination, as shown in block 715. A position of the display relative to the object is then determined based on the reference image and the first captured image, as shown in block 720.

In some embodiments, there may be provided a system comprising a processing arrangement adapted to carry out any method previously described with reference to FIGS. 1 to 5.

Figure 6:
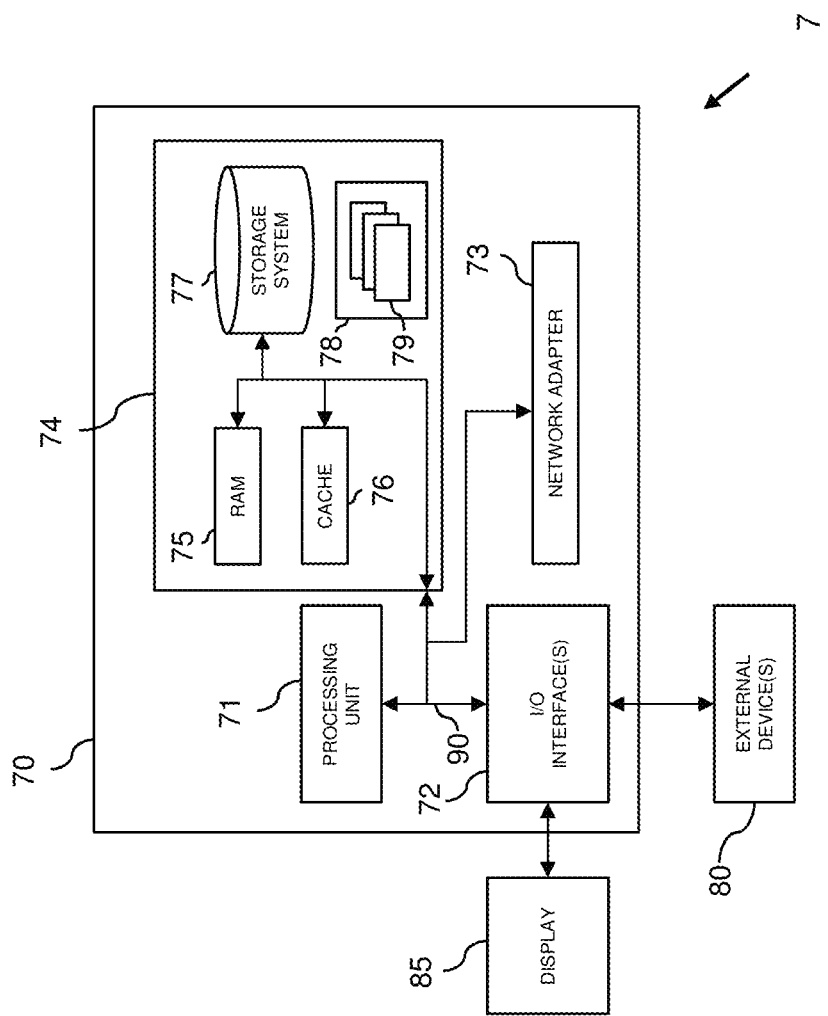
FIG. 6 illustrates a system for according to an embodiment.

By way of example, as illustrated in FIG. 6, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for determining a position of a display relative to an object within a field of view of the display, the method comprising:
controlling the display to display a default image and to cause the field of view to be in a reference state of illumination;
obtaining a reference image of the field of view, including the object, in the reference state of illumination;
controlling the display to display a first image and to cause the field of view to be in a first state of illumination different from the reference state of illumination;
obtaining a first captured image of the field of view, including the object, in the first state of illumination; and
determining the position of the display relative to the object based on a comparison of the reference image and the first captured image, wherein both the reference image and the first captured image are captured by a camera in the display.

2. The method of claim 1, wherein, in the reference state of illumination, the display is powered off.

3. The method of claim 1, wherein, in the reference state of illumination, the display displays a base image different from the first image.

4. The method of claim 1, wherein the first image comprises a block or pattern comprising a first color.

5. The method of claim 1, wherein determining a position of the display relative to the object comprises:
determining a difference between the reference image and the first captured image; and
determining a position of the display relative to the object based on the determined difference.

6. The method of claim 5, wherein determining a difference between the reference image and the first captured image comprises subtracting the reference image from the first captured image to obtain a difference image,
and wherein determining a position of the display relative to the object comprises analyzing the difference image.

7. The method of claim 1, further comprising generating a signal for adjusting a position of the display relative to the object based on the determined position of the display relative to the object.

8. The method of claim 1, further comprising:
controlling the display to display a second image to the object to cause the field of view to be in a second state of illumination different from the first state of illumination, the second image being different from the first image;
obtaining a second captured image of the field of view in the second state of illumination;
determining an orientation of the display based on the first captured image and the second captured image; and
generating a signal for adjusting an orientation of the display relative to the object based on the determined orientation of the display.

9. The method of claim 8, wherein determining an orientation of the display comprises:
determining a difference between the first captured image and the second captured image; and
determining an orientation of the display based on the determined difference between the first captured image and the second captured image.

10. The method of claim 9, wherein determining a difference between the first captured image and the second captured image comprises subtracting the first captured image from the second captured image to obtain a delta image,
and wherein determining an orientation of the display comprises analyzing the delta image.

11. The method of claim 8, wherein the first image comprises a block or pattern comprising a first color in a first position in the first image, wherein the second image comprises a block or pattern comprising the first color in a second position in the second image, the second position being offset relative to the first position in a reference direction,
and wherein the step of determining an orientation of the display is further based on the reference direction.

12. The method of claim 1, wherein the object comprises a head of a person.

13. A computer program product for determining a position of a display relative to an object within a field of view of the display, the computer program product comprising a non-transitory computer readable storage medium having program instructions embodied therewith, the program instructions executable by a processing unit to cause the processing unit to perform a method comprising:
controlling the display to display a default image and to cause the field of view to be in a reference state of illumination;
obtaining a reference image of the field of view, including the object, in the reference state of illumination;
controlling the display to display a first image and to cause the field of view to be in a first state of illumination different from the reference state of illumination,
obtaining a first captured image of the field of view, including the object, in the first state of illumination; and
determining a the position of the display relative to the object based on a comparison of the reference image and the first captured image, wherein both the reference image and the first captured image are captured by a camera in the display.

14. A system comprising at least one processor and the computer program product of claim 13, wherein the at least one processor is adapted to execute the computer program code of said computer program product.

15. A system for determining a position of a display relative to an object within a field of view of the display, the system comprising:
an interface adapted to obtain a reference image of the field of view in a reference state of illumination and to obtain a first captured image of the field of view in a first state of illumination different from the reference state of illumination;

a display controller adapted to control the display to display a first image and to cause the field of view to be in the first state of illumination and a default image to cause the field of view to be in the first state of illumination; and a calculation unit adapted to determine the position of the display relative to the object based on a comparison of the reference image and the first captured image, wherein both the reference image and the first captured image are captured by a camera in the display.

16. The system of claim 15, wherein the interface comprises an image capture device adapted to capture at least one of the reference image of the field of view and the first captured image of the field of view.

17. The system of claim 15, wherein the calculation unit is adapted to: determine a difference between the reference image and the first captured image; and determine a position of the display relative to the object based on the determined difference.

18. The system of claim 15, further comprising:
a signal generator adapted to generate a signal for adjusting a position of the display relative to the object based on the determined position of the display relative to the object.

19. The system of claim 15, wherein, in the reference state of illumination, the display is adapted to either be powered off or display a base image different from the first image.

20. The system of claim 15, wherein the display controller is further adapted to control the display to display a second image to the object to cause the field of view to be in a second state of illumination different from the first state of illumination, the second image being different from the first image, wherein the interface is further adapted to obtain a second captured image of the field of view in the second state of illumination, and wherein the calculation unit is further adapted to determine an orientation of the display based on the first captured image and the second captured image.

* * * * *